United States Patent
Dudda et al.

(10) Patent No.: US 10,412,634 B2
(45) Date of Patent: Sep. 10, 2019

(54) PREDICTIVE ADAPTIVE QUEUE MANAGEMENT

(71) Applicant: Telefonaktiebolaget LM Ericsson (publ), Stockholm (SE)

(72) Inventors: Torsten Dudda, Aachen (DE); Martin Isaksson, Stockholm (SE); Reem Karaki, Aachen (DE); Henning Wiemann, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/747,811

(22) PCT Filed: Aug. 13, 2015

(86) PCT No.: PCT/EP2015/068649
§ 371 (c)(1),
(2) Date: Jan. 26, 2018

(87) PCT Pub. No.: WO2017/025143
PCT Pub. Date: Feb. 16, 2017

(65) Prior Publication Data
US 2018/0227801 A1 Aug. 9, 2018

(51) Int. Cl.
*H04L 12/26* (2006.01)
*H04W 28/14* (2009.01)
(Continued)

(52) U.S. Cl.
CPC ............ *H04W 28/14* (2013.01); *H04L 47/30* (2013.01); *H04L 47/6255* (2013.01);
(Continued)

(58) Field of Classification Search
CPC ......... H04L 47/10; H04L 47/35; H04L 47/30; H04L 47/32
See application file for complete search history.

(56) References Cited

U.S. PATENT DOCUMENTS 8,238,361 B2 * 8/2012 Carlsson ................. H04L 47/10
370/232
8,964,539 B2 2/2015 Susitaival et al.
(Continued)

FOREIGN PATENT DOCUMENTS

WO 2008/076017 A1 6/2008

OTHER PUBLICATIONS

Paxon, V. et al., "Computing TCP's Retransmission Timer", Internet Engineering Task Force (IETF), Request for Comments: 6298, Obsoletes: 2988, Updates: 1122; Category: Standards Track; ISSN: 2070-1721, Jun. 2011, pp. 1-11.
(Continued)

*Primary Examiner* — Siren Wei
(74) *Attorney, Agent, or Firm* — Patent Portfolio Builders, PLLC

(57) ABSTRACT

The present disclosure generally relates to the field of queue management. More specifically, the present disclosure relates to a technique of adjusting adaptive queue management operation in a wireless communication network. A method embodiment comprises determining (S202), by an access network node (100) of the wireless communication network, whether an increase in capacity for data transmission between the access network node (100) and a wireless communication device (300) is expected, and adjusting (S204), by the access network node (100), AQM operation associated with the access network node (100), if it is determined that an increase in capacity for data transmission between the access network node (100) and the wireless communication device (300) is expected.

17 Claims, 8 Drawing Sheets

(51) Int. Cl.
*H04W 28/02* (2009.01)
*H04W 28/08* (2009.01)
*H04L 12/863* (2013.01)
*H04L 12/911* (2013.01)
*H04L 12/835* (2013.01)
*H04L 12/891* (2013.01)

(52) U.S. Cl.
CPC ........... *H04L 47/823* (2013.01); *H04W 28/02* (2013.01); *H04W 28/0278* (2013.01); *H04W 28/08* (2013.01); *H04L 47/41* (2013.01)

(56) References Cited

U.S. PATENT DOCUMENTS

| | | | |
|---|---|---|---|
| 2005/0262266 A1* | 11/2005 | Wiberg | H04L 47/10 709/238 |
| 2007/0091799 A1 | 4/2007 | Weimann et al. | |
| 2010/0202469 A1* | 8/2010 | Isaksson | H04L 47/10 370/412 |
| 2011/0249553 A1* | 10/2011 | Wang | H04L 47/225 370/230 |
| 2014/0119188 A1* | 5/2014 | Geijer Lundin | H04W 52/0206 370/235 |

OTHER PUBLICATIONS

Allman, M. et al., "TCP Congestion Control", Network Working Group, Request for Comments: 5681, Obsoletes: 2581, Category: Standards Track, Sep. 2009, pp. 1-18.

Ericsson, "On the Need for Active Queue Management for non-GBR Bearers", 3GPP-RAN WG2 Meeting #60bis, Feb. 11-15, 2008, pp. 1-6, Sorrento, Italy, R2-080937.

3RD Generation Partnership Project, "3rd Generation Partnership Project; Technical Specification Group Radio Access Network; Evolved Universal Terrestrial Radio Access Network (E-UTRAN); X2 interface user plane protocol (Release 12)", 3GPP TS 36.425 V12.0.0, Dec. 2014, pp. 1-15.

International Preliminary Report on Patentability issued in application No. PCT/EP2015/068649 dated Feb. 13, 2018; 7 pages.

* cited by examiner

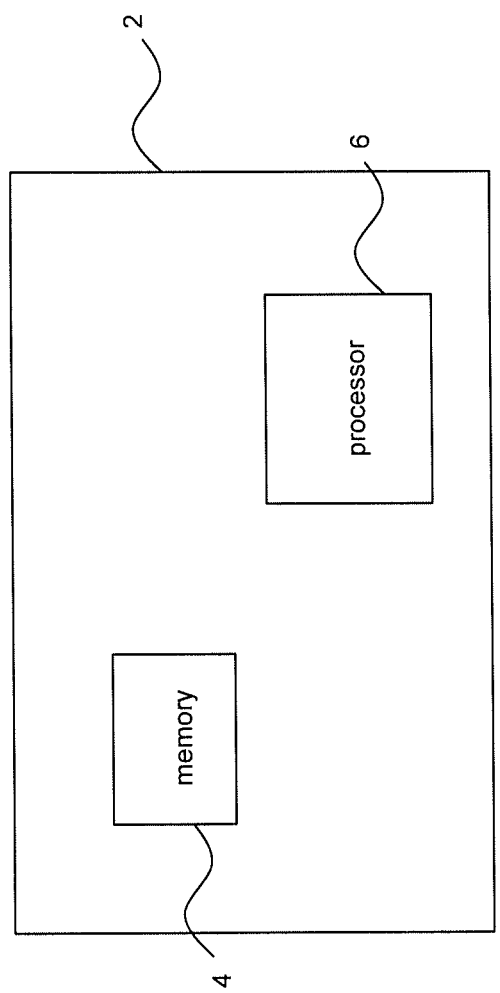

PREDICTIVE ADAPTIVE QUEUE MANAGEMENT

TECHNICAL FIELD

The present disclosure generally relates to the field of queue management. More specifically, the present disclosure relates to a technique of adjusting adaptive queue management operation in a wireless communication network.

BACKGROUND

Adaptive queue management (AQM) is applied to transmission buffers in a base station to keep the packet round trip time (or round-trip-time; RTT) within reasonable bounds. More particularly, AQM acts to keep the time the system reacts to new input, e.g. user commands, within a reasonable time bound. Such new input may be packet data. For packet data sent over Transmission Control Protocol (TCP), the RTT affects for example the send rate as well as the congestion window size. TCP is one of the core protocols of the Internet Protocol (IP) suite (the entire suite is often called TCP/IP). IP works by exchanging pieces of information called packets. When an application program desires to send a large chunk of data across the Internet using IP, instead of breaking the data into IP-sized pieces and issuing a series of IP requests, the application program can issue a single request to TCP and let TCP handle the IP details. Due to network congestion, traffic load balancing, or other unpredictable network behavior, IP packets can be lost, duplicated, or delivered out of order. TCP detects these problems, requests retransmission of lost data, rearranges out-of-order data, and even helps minimize network congestion to reduce the occurrence of the other problems. If the data still remains undelivered, its source is notified of this failure. Once the TCP receiver has reassembled the sequence of octets originally transmitted, the TCP receiver passes them to the receiving application.

A main aspect of TCP is congestion control. TCP uses a number of mechanisms to achieve high performance and avoid congestion collapse, where network performance can decrease by several orders of magnitude. These mechanisms control the rate of data entering the network, keeping the data flow below a rate that would trigger collapse. Acknowledgments for data sent, or lack of acknowledgments, are used by senders to infer network conditions between the TCP sender and receiver. Coupled with timers, TCP senders and receivers can alter the behavior of the flow of data. This is more generally referred to as congestion control and/or network congestion avoidance. In TCP, senders employ a retransmission timeout (RTO) that is based on the estimated RTT between the sender and receiver. The behavior of this timer is specified in Request For Comments (RFC) 6298. TCP applies congestion control and can generally be distinguished to work in two phases, namely slow-start (which may also be referred to as slowstart or slow start) congestion and congestion avoidance. Modern implementations of TCP contain four intertwined algorithms: Slow-start congestion, congestion avoidance, fast retransmit, and fast recovery, as described in RFC 5681.

Slow-start is the initial part of the congestion control strategy used by TCP. Slow-start is used to avoid sending more data than the network is capable of transmitting, that is, to avoid causing network congestion. The algorithm is specified by RFC 5681 and is also known as the exponential growth phase. Slow-start begins initially with a congestion window size (cwnd) of 1, 2 or 10. The value of the congestion window will be increased with each acknowledgment (ACK) of each segment received by the transmitter, effectively doubling the window size each RTT. In other words, in this phase the congestion window, i.e. the number of TCP segments that can be in-flight, increases exponentially. To give an example, if 1 segment is sent and 1 ACK is received, the congestion window is increased by 1. If 2 segments are sent and 2 ACKs are received, the congestion window is increases twice by 1. The congestion window is further increased exponentially, if 4 or more segments are sent. A fast increase is important to utilize the full link capacity. How fast the increase happens depends on the RTT, i.e. the time between sending a segment and receiving the corresponding ACK. The transmission rate will be increased with slow-start algorithm until either a loss is detected, or the receiver's advertised window (rwnd) is the limiting factor, or the slow start threshold (ssthresh) is reached. If a loss event occurs, TCP assumes that it is due to network congestion and takes steps to reduce the offered load on the network. Although the strategy is referred to as "slow-start" (before slow-start was introduced in TCP, the initial pre-congestion avoidance phase which was used instead of the slow start phase was even faster), the used congestion window growth is quite aggressive, at least more aggressive than the subsequent congestion avoidance phase.

The second phase is called congestion avoidance. Once a loss is detected or the ssthresh is reached in the slow start phase, TCP changes from slow-start algorithm to congestion avoidance algorithm. The congestion avoidance phase is more conservative. In the congestion avoidance phase, the congestion window increases for typical congestion avoidance algorithms only linearly, i.e. the congestion window is increased by 1 segment for each RTT. The overall end-to-end delay, i.e. user experience, for services using TCP is influenced by the TCP congestion control.

AQM and artificial/active packet drop is used to further control the behavior of TCP. A packet drop of queued packets may, for example, lead to the termination of the TCP slow start, i.e. the fast growth of the congestion window. This is because it is assumed that the packet drop occurred due to congestion. For application layer traffic using TCP, TCP typically ramps up its congestion window during the slow start phase until congestion is identified on the channel. Congestion is, for example, identified when a buffer in a node along the channel overflows and a packet is dropped, e.g. in the eNB. This might lead to high round trip times e.g. in case of large buffers. With AQM, a packet is dropped before, i.e. if a buffered packet reaches a certain predefined queuing time. The latter is the above-mentioned artificial packet drop. In this way, the TCP slow start phase is artificially ended and TCP goes into congestion avoidance mode where the TCP congestion window increases only slowly. For constant or increased RTTs, a throughput increase can only be utilized by a proportional increase in allowed data in flight, i.e. the congestion window size. AQM may be achieved in several ways.

With AQM mechanisms, congestion of a data packet queue can be indicated. An artificial packet drop by AQM, for example, would be interpreted as congestion in the network by TCP. Based on that, TCP would lower its transmission rate, and/or the congestion window growth.

When link capacity is added, for example, after the TCP slow start phase, it cannot be utilized as fast as possible or ideally immediately, since the congestion window does not increase fast to reach the total link capacity. There are several ways of adding link capacity, one of them being dual connectivity. Dual connectivity had been standardized within 3$^{rd}$ Generation Partnership Program (3GPP) in Rel-12. In dual connectivity a user equipment (UE) may simultaneously receive from and transmit to at least two different base stations. The two different base stations are usually denoted as Master-eNodeB or in short MeNB and Secondary-eNodeB or in short SeNB. The two base stations usually operate on different frequencies. Similarly to dual connectivity in Long Term Evolution (LTE), also LTE and WiFi might be aggregated to increase link capacity.

Thus, there is a drawback under the current AQM operation, if link capacity is added when the congestion window does not increase fast to reach the total link capacity. The problem of adding link capacity in such a phase, e.g. after slow start, is especially severe if the added capacity is significantly large, e.g. when adding a secondary eNB to serve the UE, e.g. in LTE dual connectivity or when adding a WiFi access point (AP) to serve the UE in LTE/WiFi aggregation.

SUMMARY

Accordingly, there is a need for an improved technique for adaptive queue management operation in a wireless communication network.

According to a first aspect, a method of adjusting adaptive queue management (AQM) operation in a wireless communication network is provided. The method comprises determining, by an access network node of the wireless communication network, whether an increase in capacity for data transmission between the access network node and a wireless communication device is expected. The method further comprises adjusting, by the access network node, AQM operation associated with the access network node, if it is determined that an increase in capacity for data transmission between the access network node and the wireless communication device is expected.

In this way, if it is determined that an increase in capacity is expected, AQM operation may be adjusted to be more suitable for or to be adapted for operation with the increased capacity. If no increase in capacity is expected, AQM operation may be maintained as it is (unadjusted) to be more suitable for or to be adapted for operation with the current (non increased) capacity.

The step of determining whether an increase in capacity is expected may comprise determining whether one or more additional radio resources for data transmission between the access network node and a wireless communication device are expected to be added. Alternatively or additionally, the step of determining whether an increase in capacity is expected may comprise determining whether more efficient use of radio resources for data transmission between the access network node and a wireless communication device is expected.

The step of determining whether an increase in capacity is expected may include determining whether activation of a further access network node for dual connectivity to the wireless communication device is expected. Alternatively or additionally, the step of determining whether an increase in capacity is expected may include determining whether activation of a further access network cell for carrier aggregation to the wireless communication device is expected. Alternatively or additionally, the step of determining whether an increase in capacity is expected may include determining whether prioritization of the wireless communication device for use of radio resources is expected. Alternatively or additionally, the step of determining whether an increase in capacity is expected may include determining whether activation of an access point for utilization of radio resources of the access network node and the access point is expected. Alternatively or additionally, the step of determining whether an increase in capacity is expected may include determining whether aggregation of licensed and unlicensed radio resources for the wireless communication device is expected. Alternatively or additionally, the step of determining whether an increase in capacity is expected may include determining whether activation for a higher capacity is expected. Activation for higher capacity may include activating one or more established or existing radio resources to provide higher capacity. This may include more efficient usage of radio resources.

By determining that an increase in capacity is expected it may be determined that an increase in throughput of the system is expected. The capacity and thus the throughput may be increased or enhanced in various ways. In the following, an example for capacity enhancement and thus throughput-enhancement is given for sake of explanation rather than limitation. For example, capacity enhancement and thus throughput enhancement may be achieved by means of dual connectivity. Dual connectivity is a feature defined from the communication device, e.g. user equipment (UE), perspective, wherein the communication device, e.g. UE, may simultaneously receive from and transmit to at least two different network points, e.g. the access network node and a secondary access network node. In dual connectivity, no data duplication is usually performed but one data packet may be sent either between the communication device, e.g. UE, and one of the network points or between the UE and the one of the network points via the other of the network points. Dual connectivity had been standardized by 3$^{rd}$ Generation Partnership Program (3GPP) in Rel-12. The two different network points are usually denoted as master base station and a secondary base station.

By activating the secondary access network node for dual connectivity, throughput of the data delivery may be optimized. The step of activating the secondary access network node for dual connectivity may comprise activating, by the access network node, the secondary access network node for dual connectivity.

The step of determining whether an increase in capacity is expected may comprise monitoring at least one of a buffer fill state and a buffer fill rate of a data buffer associated with the access network node.

The step of adjusting the AQM operation may comprise adjusting one or more AQM parameters of the AQM operation associated with the access network node. The step of adjusting the one or more AQM parameters may comprise increasing the one or more AQM parameters. The step of increasing the one or more AQM parameters may comprise increasing an AQM parameter indicating a time when to drop a first packet of the data transmission between the access network node and the wireless communication device. By increasing an AQM parameter indicating a time when to drop a first packet of the data transmission between the access network node and the wireless communication device, an indication of congestion of a data packet queue (in this case, drop of the first packet) is suppressed. As a consequence, the increased capacity may be added in a phase, e.g. slow start phase, in which the link capacity increases faster than in a phase, e.g. congestion avoidance phase, in which the link capacity increases slower.

The step of adjusting the AQM operation may comprise switching off the AQM operation.

The method may comprise detecting a trigger event and readjusting the AQM operation if the trigger event is detected. The step of readjusting the AQM operation may comprise readjusting one or more AQM parameters of the AQM operation. The step of readjusting the one or more AQM parameters may comprise decreasing the one or more AQM parameters. For example, the step of readjusting the one or more AQM parameters may comprise decreasing the one or more previously increased AQM parameters. The one or more AQM parameters may be decreased by the same amount as or a different amount than the amount by which they have previously been increased.

The one or more AQM parameters may be readjusted to one or more initial values of the AQM operation. Alternatively or additionally, the one or more AQM parameters may be readjusted to one or more default values of the AQM operation. Alternatively or additionally, the one or more AQM parameters may be readjusted to one or more values estimated based on a current throughput of the data transmission between the access network node and the wireless communication device. Alternatively or additionally, the one or more AQM parameters may be readjusted to one or more values estimated based on a round-trip-time (RTT) of the data transmission between the access network node and the wireless communication device.

The step of readjusting the AQM operation may comprise reactivating a switched-off AQM operation.

The step of detecting the trigger event may comprise detecting whether the increased capacity is configured.

The step of detecting the trigger event may comprise evaluating whether the AQM operation has been adjusted for a certain time.

The step of detecting the trigger event may comprise monitoring a buffer fill state of a data buffer associated with the access network node. Alternatively or additionally, the step of detecting the trigger event may comprise monitoring a buffer fill rate of a data buffer associated with the access network node. Alternatively or additionally, the step of detecting the trigger event may comprise monitoring arrival and departure times of data packets in a data buffer associated with the access network node. Alternatively or additionally, the step of detecting the trigger event may comprise monitoring a queuing time of data packets in a data buffer associated with the access network node.

According to a second aspect, a computer program is provided. The computer program comprises program code portions for causing the steps of any one of the method aspects described herein to be performed, when the computer program is run on a computer system or on one or more computing devices. The computer program may be stored on a computer-readable recording medium or may be downloadable as a signal.

According to a third aspect, an access network node for adjusting adaptive queue management (AQM) operation in a wireless communication network is provided. The access network node comprises a determining component and an adjusting component. The determining component is configured to determine whether an increase in capacity for data transmission between the access network node and a wireless communication device is expected. The adjusting component is configured to adjust AQM operation associated with the access network node, if it is determined that an increase in capacity is expected.

The access network node may be configured to perform any of the method steps described herein. The access network node may comprise or be configured as or be part of a radio base station, a radio network controller (RNC), a nodeB, an eNodeB or an access point. For example, the access network node may be configured as a Master eNodeB in dual connectivity.

According to a fourth aspect, a wireless communication system is provided. The wireless communication system comprises the access network node as described herein and one or more wireless communication devices such as user equipments (UEs). The wireless communication system may be configured to perform the steps of any one of the method aspects as described herein.

In general, the steps of any one of the method aspects described herein may equally be performed in one or more suitable components, devices or units, e.g. in suitable components of the access network node and/or the wireless communication system.

BRIEF DESCRIPTION OF THE DRAWINGS

In the following, the present disclosure will be further described with reference to exemplary embodiments illustrated in the Figures, in which:

FIG. 5 is a block diagram schematically illustrating an embodiment of an access network node.

DETAILED DESCRIPTION

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, although the present disclosure is mainly described with reference to Long Term Evolution (LTE) as a specific example for a wireless communication network, the present disclosure may be practiced in any network to which mobile or stationary users using a corresponding user equipment (UE) may attach. For example, the present disclosure is applicable to other cellular networks such as Global System for Mobile Communications (GSM) networks, Universal Mobile Telecommunications System (UMTS) networks, LTE-Advanced (LTE-A) networks, 5G networks, WiFi networks or to Wireless Local Area Network (WLAN) or similar wireless networks and a combination thereof.

Those skilled in the art will further appreciate that functions explained herein below may be implemented using individual hardware circuitry, using software functioning in conjunction with a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor and a memory coupled to a processor, wherein the memory is encoded with one or more programs to cause the processor to perform the methods disclosed herein when executed by the processor.

Figure 1:
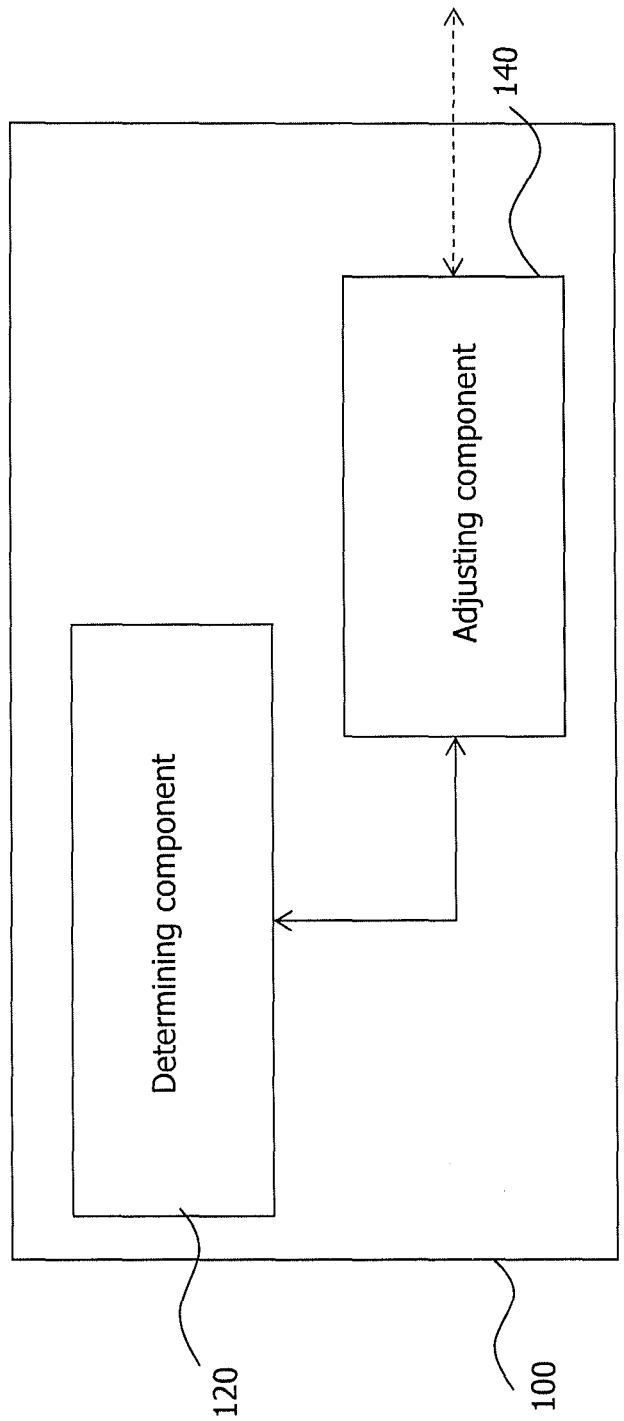
FIG. 1 is a schematic illustration of a device embodiment of an access network node.

FIG. 1 shows an embodiment of an access network node 100. The access network node 100 is adapted for adjusting adaptive queue management (AQM) operation in a wireless communication network. The access network node 100 may be, comprise or be part of an eNodeB in terms of LTE or LTE-A. The access network node 100 comprises a determining component 120 and an adjusting component 140.

The determining component 140 is configured to determine whether an increase in capacity for data transmission between the access network node 100 and a wireless communication device, e.g. a UE, is expected. The adjusting component 140 is configured to adjust AQM operation associated with the access network node 100, if it is determined that an increase in capacity is expected.

The access network node 100 will be further described below with respect to FIG. 2.

Figure 2:
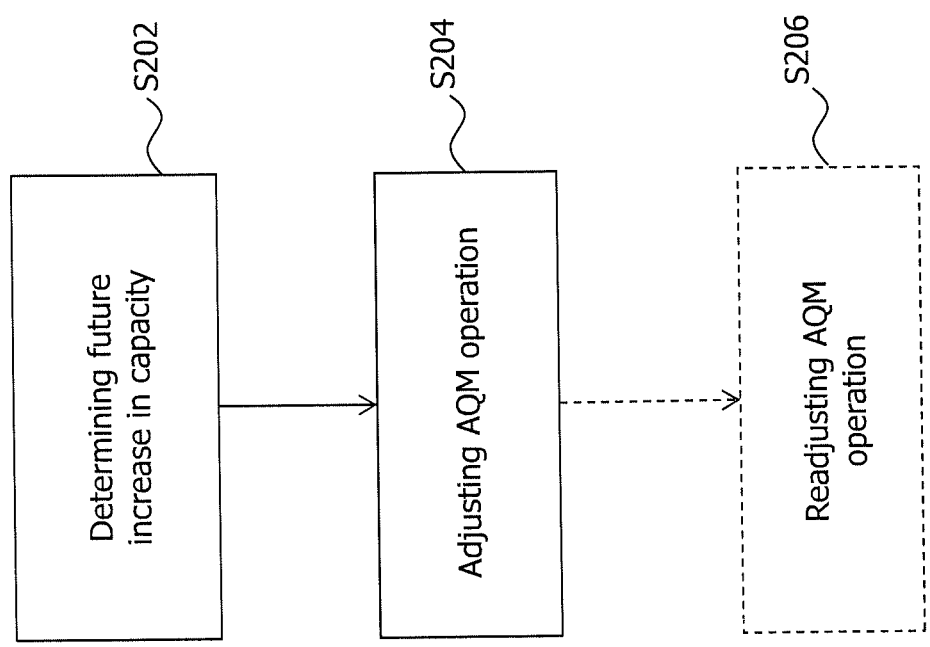
FIG. 2 is a flowchart illustrating a method embodiment performed in the access network node of FIG. 1.

FIG. 2 shows a method embodiment which can be implemented in the access network node 100 according to the embodiment of FIG. 1. The method is for adjusting AQM operation in a wireless communication network. In step S202, it is determined, by the access network node 100, whether an increase in capacity for data transmission between the access network node 100 and a wireless communication device is expected. For example, the determining component 120 determines whether an increase in capacity for data transmission between the access network node 100 and the wireless communication device, e.g. the UE, is expected. In step S204, AQM operation associated with the access network node 100 is adjusted by the access network node 100, if it is determined that an increase in capacity for data transmission between the access network node 100 and the wireless communication device, e.g. the UE, is expected. For example, the adjusting component 140 adjusts AQM operation associated with the access network node 100, if it is determined that an increase in capacity for data transmission between the access network node 100 and the wireless communication device, e.g. the UE, is expected.

In an optional step S206, AQM operation associated with the access network node 100 may be readjusted by the access network node 100, if a trigger event is detected. For example, the adjusting component 140 may readjust AQM operation associated with the access network node 100, if the trigger event is detected. Further details regarding the trigger event will be described below.

The present disclosure is described in the following mainly within the context of LTE. It should be understood that the problems and solutions described herein are equally applicable to wireless access networks and UEs implementing other access technologies and standards. Thus, LTE is used as an example technology where the proposed technique is suitable, and using LTE in the following therefore is useful for understanding the technique described herein. Thus, in the following, for sake of explanation rather than limitation, the access network node 100 will be referred to as eNB 100 to illustrate, by way of example, that the access network node 100 can be configured as a base station and that the technique proposed herein can be used and implemented in LTE. Similarly, wireless communication devices will be referred to as UEs to illustrate, by way of example, that the technique proposed herein can be used and implemented in LTE.

Further details regarding eNB 100 and the method embodiment performed therein are described below with respect to FIGS. 3a to 6. Before these details are explained, the general concept of congestion avoidance and Dual Connectivity (DC) is explained with respect to FIGS. 3a and 3b.

As stated above, it is determined in step S202 that an increase in capacity is expected. From this, it may be determined that an increase in throughput of the system is expected. The capacity and thus the throughput may be increased or enhanced in various ways. One example for capacity enhancement and thus throughput-enhancement is DC. DC is a feature defined from the UE perspective, wherein the UE may simultaneously receive from and transmit to at least two different network points. In DC no data duplication is usually performed but one data packet may be sent either between the UE and one of the network points or between the UE and the one of the network points via the other of the network points. D C had been standardized in 3GPP Rel-12. The two different network points are usually denoted as Master-eNodeB (referred to as MeNB 100 in the following to illustrate, by way of example, that eNB 100 of FIG. 1 may implement the functionality of MeNB 100 of FIGS. 3a and 3b) and Secondary-eNodeB (referred to as SeNB 200 in the following). MeNB 100 and SeNB 200 may operate on different frequencies. In the following, eNB 100 may, depending on the context, sometimes be referred to as eNB 100 (e.g. when not in DC operation) or as MeNB 100 (e.g. when in DC operation).

DC had been standardized and is described in TS 36.300 as summarized in this paragraph: E-UTRAN supports DC operation whereby a multiple Rx/Tx UE in RRC_CONNECTED is configured to utilise radio resources provided by two distinct schedulers, located in two eNBs connected via a non-ideal backhaul over the X2 interface (see TR 36.842 and TR 36.932). The overall E-UTRAN architecture as specified in section 4 and depicted in FIG. 4-1 of TS 36.300 is applicable for DC as well. In general, eNBs involved in DC for a certain UE may assume two different roles: an eNB may either act as an MeNB or as an SeNB. In DC a UE is connected to one MeNB and one SeNB.

Figure 3A:
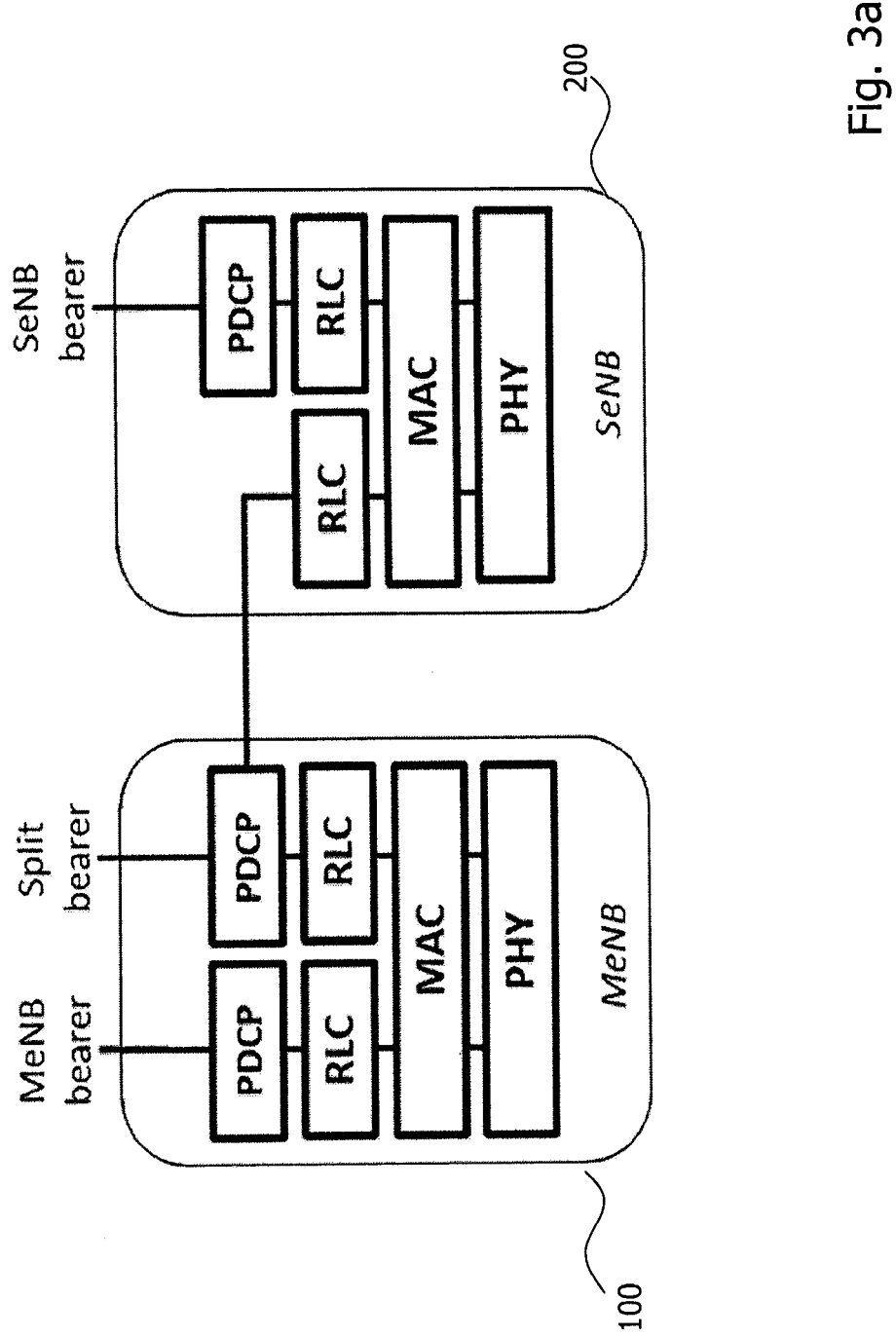
FIGS. 3a and 3b schematically illustrate dual connectivity.
Figure 3B:
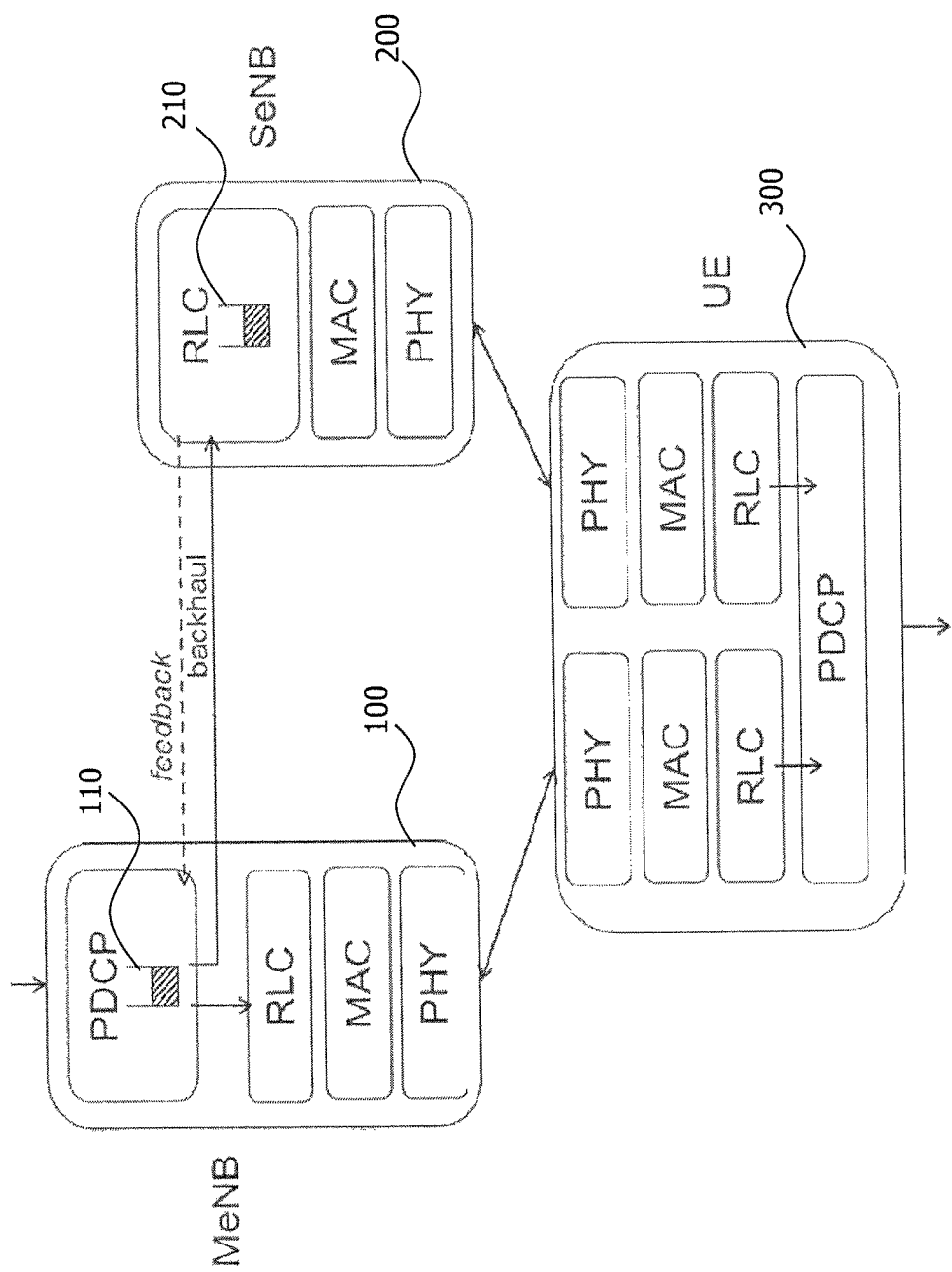

FIGS. 3a and 3b schematically show the protocol architecture in DC. The currently envisaged protocol architecture for Rel-12, as shown in FIGS. 3a and 3b, supports three types of radio bearers, namely bearer served by MeNB 100, bearer served by SeNB 200, and bearer split over both MeNB 100 and SeNB 200. To convey payload data, all of the aforementioned bearer types may be used. RRC control signalling may only use bearers served by MeNB 100. The split bearer architecture of DC can be activated dynamically for UE 300 (see FIG. 3b) by means of Radio Resource Control (RRC) reconfiguration of an existing MeNB 100 radio bearer. For the uplink, UE 300 is statically (by RRC reconfiguration) configured to either route Packet Data Convergence Protocol (PDCP) Packet Data Units (PDUs) to the Radio Link Control (RLC) of MeNB 100 or SeNB 200. In the downlink however, PDCP PDUs may be dynamically routed via RLC of MeNB 100 or RLC of SeNB 200 or via both, i.e. duplication, to UE 300. The decision is on PDU individual level.

In FIG. 3b, some further details of DC are shown. As exemplarily shown in FIG. 3b, MeNB 100 comprises a data buffer 110. Data buffer 110 is referred to as PDCP buffer 110 in the following, for sake of explanation rather than limitation, as it is arranged, in the example of FIG. 3b, in PCDP layer. Likewise, as exemplarily shown in FIG. 3b, SeNB 200 comprises a data buffer 210. Data buffer 210 is referred to as RLC buffer 210 in the following, for sake of explanation rather than limitation, as it is arranged, in the example of FIG. 3*b*, in RLC layer. Still further, a UE 300 and an exemplary protocol stack of UE 300 are shown in FIG. 3*b*.

TCP congestion avoidance measures enable congestion handling of not-sent data packets in an eNB buffer such as PDCP buffer 110. As described above, the increase of the congestion window size is different for the initial slow-start phase and the congestion avoidance phase. In the slow start phase, eNB 100 has free capacity to send received IP packets in which TCP packet is encapsulated. For every TCP ACK for one successfully sent packet, the window size is exponentially increased. In the congestion avoidance phase, eNB capacity is fully utilized. Therefore, inflow of the IP packets from the server is slowed down. For every round trip time (RTT), the window size is increased by one, i.e. all the window size should be ACKed, to increase the window size by on.

Transition between the two phases is usually marked by a congestion indication corresponding to a loss of a packet in PDCP. That is, AQM allows for dropping not-sent packets from the PDCP buffer 110, so the queuing delay in the buffer and therefore the RRT (measured from TCP layer in a network server to UE 300 via eNB 100 and back) is decreased. The packet loss marking the transition between the two phases corresponds to either a packet loss on the radio link (implying no ACK is sent from RLC to PDCP) or to a deliberate packet drop from PDCP buffer 110 due to the AQM.

If the SeNB 200 link is added to the MeNB 100 link after the slow start phase (SeNB 200 activation after the TCP slow start), the congestion window may converge exponentially to the size that corresponds to the MeNB 100 link throughput. The congestion window will (typically) grow until the MeNB 100 total buffer is full and a packet is dropped or a packet is artificially dropped/actively discarded before by AQM. That is, the exponential growth phase is over after the MeNB 100 link throughput is reached, and thus when activating the SeNB 200 after the end of slow start, it SeNB 200 link does not benefit from the exponential growth, but only from linear growth. Thus, the congestion window will increase linearly in the congestion avoidance phase to finally reach a size that corresponds to the aggregated throughput of the MeNB 100 and SeNB 200 link together.

In consequence, adding resources and therefore increasing the throughput of eNB 100 to send data to UE 300 requires a change in the AQM, since otherwise the newly added resources are not properly considered in the above TCP congestion measures. In other words, in normal AQM operation, the added capacity is increased only linearly due to the congestion avoidance phase.

Thus, a technique is proposed to adjust AQM operation. This technique is exemplarily performed by eNB 100, which is still in the slow-start phase, at the PDPC layer level.

In step S202, eNB 100 determines whether an increase in capacity is expected. For example, eNB 100 determines how likely additional resources are added in a certain future time. In a first option, the increase in capacity may be determined by considering whether data aggregation is to be expected. There may be several ways of data aggregation, some of them are described in more detail below. In a second option, the increase in capacity may be determined by considering PDCP buffer 110.

According to a first exemplary implementation of the first option of implementing step S202, the determining component 120 is configured to determine whether activation of SeNB 200 for DC to UE 300 is expected. In LTE DC, throughput is increased by utilizing further radio resources provided by SeNB 200 providing a secondary cell group. For example, AQM parameters may be changed to improve the end user performance of applications using TCP in case that an increase in throughput can be predicted by eNB 100, e.g. by adding SeNB 200 in LTE DC.

Although the proposed technique is herein described mainly in relation to LTE DC, this is only one possible way to increase the user throughput in LTE. In DC, throughput can be increased by utilizing resources from two distinct network nodes, e.g. MeNB 100 and SeNB 200. However, the technique proposed herein is also applicable to other throughput increasing features provided by any other radio technology. It may be common for some of these throughput increasing measures, for example, that the RTT component of queuing, e.g. buffering of data before transmission, is decreased by an increased throughput. Some exemplary mechanisms for capacity increasing and thus throughput increasing measures are given in the following.

According to a second exemplary implementation of the first option of implementing step S202, the determining component 120 is configured to determine whether activation of a further access network cell for carrier aggregation (CA) to UE 300 is expected. In LTE carrier aggregation, throughput is increased by utilizing further radio resources provided by a secondary cell.

According to a third exemplary implementation of the first option of implementing step S202, the determining component 120 is configured to determine whether prioritization of UE 300 for use of radio resources is expected. By prioritization of users, throughput is increased by not sharing radio resources with other users in the system, e.g. radio resources are reserved for specific users only. Further, prioritization of user(s) in one radio technology, e.g. LTE, over other radio technologies is conceivable.

According to a fourth exemplary implementation of the first option of implementing step S202, the determining component 120 is configured to determine whether activation of a WiFi access point (AP) for utilization of radio resources of eNB 100 and the WiFi AP is expected. Thus, similarly to DC in LTE, also LTE and WiFi might be aggregated. In LTE and WiFi aggregation, throughput can be increased by utilizing radio resources of both LTE system and WiFi system. Data aggregation can be achieved at PDCP layer, similarly to DC. In one potential protocol architecture option, the data splitting point could be the same as in the split bearer option of DC, i.e. on PDCP layer of the MeNB 100. Instead of an LTE SeNB 200, a WiFi AP would be employed, i.e. instead of SeNB RLC, MAC, PHY protocols, WiFi protocols would be employed. The same applies to these protocol layers in UE 300 for the connection to the WiFi AP.

According to a fifth exemplary implementation of the first option of implementing step S202, the determining component 120 is configured to determine whether aggregation of licensed and unlicensed radio resources for UE 300 is expected. Sometimes, this technique is referred to as licensed assisted access (LAA). In LAA, throughput can be increased by utilizing radio resources from an LTE carrier in licensed as well as unlicensed spectrum. The data aggregation can e.g. be achieved by carrier aggregation mechanisms. Licensed radio resources can be considered to lie in a licensed band/licensed spectrum of the full frequency range that may be used for wireless communication. This whole spectrum is, in discrete bands, normally licensed to groups of similar services. Unlicensed radio resources may be considered to lie in an unlicensed band/spectrum of the full frequency range that may be used for wireless communication.

According to a sixth exemplary implementation of the first option of implementing step S202, the determining component 120 is configured to determine whether activation for a higher capacity is expected. This may comprise an activation of already established resources to provide higher capacity, e.g. higher throughput. For example, this activation may comprise more efficient usage of radio resources, e.g. higher modulation and coding scheme, other (more efficient) configuration and the like.

Further mechanisms exist for eNB 100 to decide whether features for throughput increase shall be activated or not for UE 300. These may for example be based on the PDCP buffer 110 and/or RLC buffer 210, e.g., may be based on observing a currently measured or expected buffer fill state or fill rate of PDCP buffer 110 and/or RLC buffer 210.

According to this second conceivable option of implementing step S202, PDCP buffer 110 of eNB 100/MeNB 100 or RLC buffer 210 of SeNB 200, respectively, may be monitored. In this second option, eNB 100, for example, monitors its current buffer fill state or its current buffer fill rate to observe whether the PDCP buffer 110 is increasing or decreasing.

According to a first exemplary implementation of the second option of implementing step S202, the determining component 120 is configured to determine whether an increase in capacity is expected by monitoring a buffer fill state of PDCP buffer 110 of eNB 100/MeNB 100. If the buffer fill state increases, it may be assumed that this is because of congestion and therefore capacity is likely to be added in the future (an increase in throughput is expected) to handle the congestion.

Figure 4A:
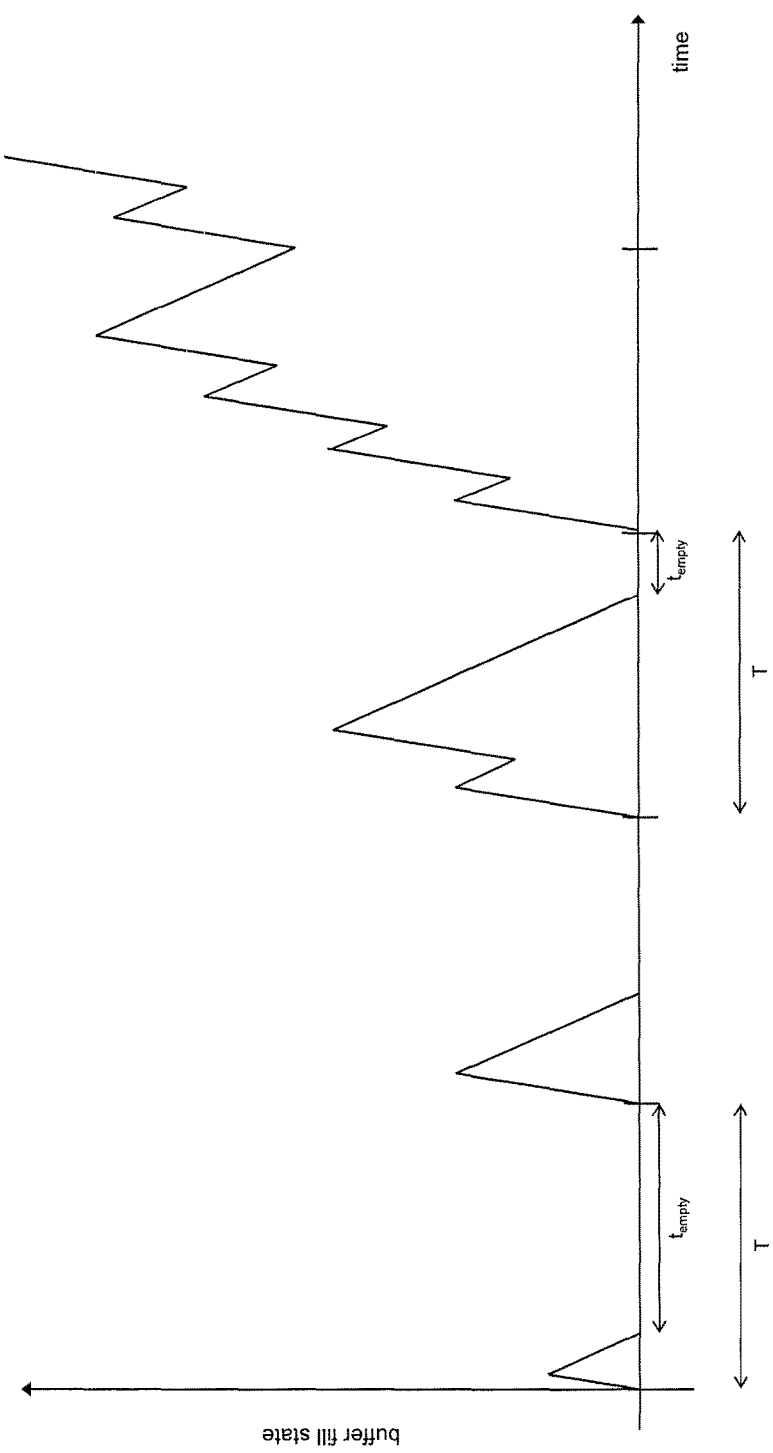
FIGS. 4a and 4b schematically illustrate a buffer fill state over time that can be used in the method embodiment of FIG. 2.

As shown in FIG. 4a, the buffer fill state is monitored by eNB 100/MeNB 100, respectively. FIG. 4a shows an example plot of the buffer fill state (i.e., the fill state of the PDCP buffer 110 in eNB 100 or MeNB 100, respectively) at different times, illustrating how the buffer fill state generally increases over time and the fraction of time with an empty buffer within a predetermined time window decreases as the end of slow start phase approaches. During slow start, the rate of data flowing into the PDCP buffer 110 is lower than the rate with which it is emptied. This causes the PDCP buffer 110 to run empty between the arrivals of different TCP transmission bursts. When approaching the end of the slow start phase, the amount of data within the PDCP buffer 110 generally increases and the times during which the PDCP buffer 110 is empty get shorter, as illustrated by FIG. 4a. The eNB 100 or MeNB 100, respectively, may record the time $t_{empty}$ during which the PDCP buffer 110 is empty within a predetermined time window T.

When there is no change of capacity, more and more packets will arrive in PCDP buffer 110 during the slow start phase TCP. For example, first, 10 segments, then 20, then 40 segments may arrive at PDCP buffer 110. Not all of them are presumably sent out by eNB 100 directly. This may be regarded as some kind of congestion in the eNB 100. Thus, the buffer fill state increases. Monitoring this can be taken as a decision basis to activate measures for more capacity. In other words, it can be derived from the monitoring of the buffer fill state that an increase in capacity is expected.

Thus, in a similar manner, when the buffer fill state increases, it may be assumed that the end of the slow start phase is approaching and additional capacity is likely to be added at the end of the slow start phase. The more full the PDCP buffer 110 is, the more imminent the end of the slow start is. The more full the PDCP buffer 110 is, the more likely the end of slow start is imminent and thus the more likely additional capacity is to be added.

Figure 4B:
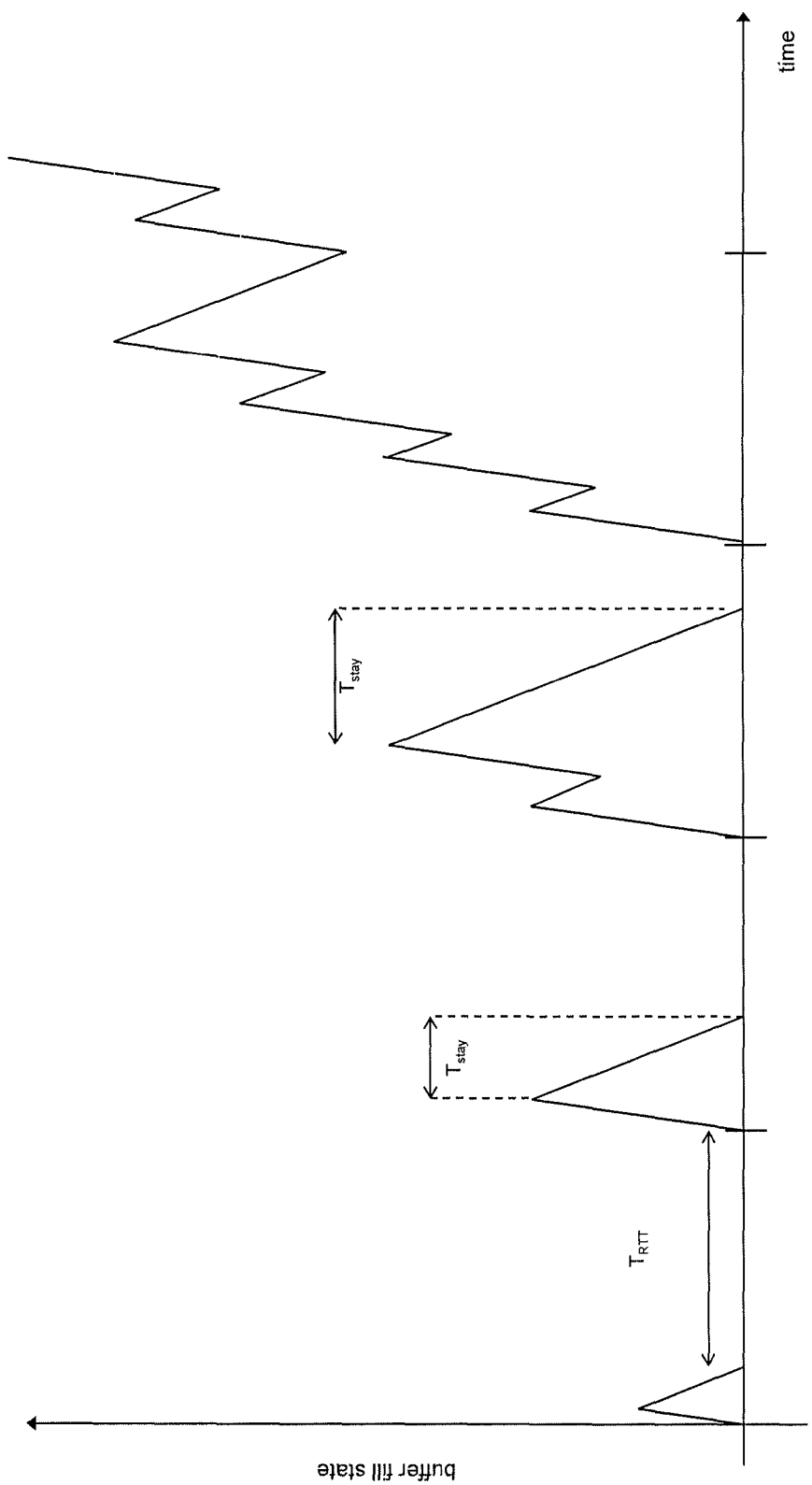

In the variant of FIG. 4b, data unit arrival and departure times are monitored by eNB 100 or MeNB 100, respectively. FIG. 4b shows an example plot of buffer fill state at different times, illustrating how the longest recorded stay in the PDCP buffer 110 increases as the end of the slow start phase approaches. When approaching the end of the slow start phase, the last data unit leaves the PDCP buffer 110 shortly before the first data unit from the next TCP transmission burst arrives. In this way, eNB 100 or MeNB 100, respectively, estimates the imminent end of the slow start phase and thus a likely increase in capacity as mentioned above. In one possible implementation, eNB 100 or MeNB 100, respectively, monitors the times of data units' arrivals in and departures from the PDCP buffer 110, $t_{arrival}$(data unit) and $t_{depart}$(data unit). From this, the length of stay in the PDCP buffer 110 $T_{stay}$(data unit)=$t_{depart}$(data unit)-$t_{arrival}$ (data unit) can be determined by eNB 100 or MeNB 100, respectively, for every data unit. Also, the link round trip time $T_{RTT}$ can be estimated by eNB 100/MeNB 100 by analyzing data unit arrival and departure times. When the longest recorded stay in the buffer max ($T_{stay}$) approaches a certain threshold $T_{thr}$, i.e. max($T_{stay}$)>ε*$T_{thr}$, the slow start phase is estimated to be over soon, i.e. the imminent end of the slow start phase is detected by eNB 100 or MeNB 100, respectively. This threshold can, for example, be set to $T_{RTT}$, or to the estimated time between two TCP transmission bursts calculated from $T_{RTT}$ and the data unit departure times.

According to a second exemplary implementation of the second option of implementing step S202, the determining component 120 is configured to determine whether an increase in capacity is expected by monitoring buffer fill rate of PDCP buffer 110 of eNB 100/MeNB 100. If the buffer fill rate increases, it may be assumed that this is because of congestion and therefore capacity is likely to be added in the future (an increase in throughput is expected) to handle the congestion.

Again, the more the rate of the PDCP buffer 110 increases, the more imminent the end of the slow start is. The more the buffer fill rate increases, the more likely the end of slow start is imminent and thus the more likely additional capacity is to be added.

By means of the examples shown in FIGS. 4a and 4b, the buffer fill state and thus also the buffer fill rate may be monitored and used as a basis for determining whether an increase in capacity is expected.

In step S204, AQM operation is adjusted, i.e. eNB 100 adjusts its AQM operation. By adjusting its AQM operation, indications of congestion, which may lead to an artificial packet drop of the AQM, may be suppressed. Artificial packet drop may be understood as actively discarding a packet. In one realization of step S204, suppressing of indications of congestion is realized by adjusting one or more AQM threshold parameters. The decision to adjust the AQM threshold parameter(s) may be based on the expected increase of capacity and throughput for the user of step S202. As mentioned above, the decision to adjust an AQM threshold parameter beside the expected increase in throughput may be based on several indications including the buffer fill state or fill rate.

The AQM parameter threshold to be adjusted may be or relate to the minimum delay of a first packet to be dropped from the buffer (often called minAgeThreshold). Thus, for example, the minAgeThreshold may be adjusted. The minAgeThreshold is the queuing delay that needs to pass before a first packet is dropped. For example, the minimum delay may be increased to a certain value or can be set to infinity. The latter may be considered equal to the AQM operation being switched off.

The effect of this increase is that the transition time instance between the two phases (slow start and congestion avoidance) is shifted to a later time. For example, in case eNB 100 knows that additional radio resources to increase the capacity and thus throughput become available in a certain time, it will increase the AQM minAgeThreshold. This is in particular useful for TCP in slow start phase, i.e. in order to delay the artificial end of the slow start (by the aforementioned AQM drop) so that the slow start phase spans also over the time when the additional radio resources are available so that the total link capacity can be utilized as quickly as possible. It is beneficial that the slow start phase is extended until the additional radio resources are available. In this way, the congestion window grows sufficiently large to fully utilize both original and additional radio resources.

In other words, it is intended to adjust, e.g. increase, the allowed "TCP overshoot", i.e. the amount of data TCP is allowed to bring in flight, e.g. buffer at the eNB 100, but only in case the eNB 100 is able to predict with a certain likelihood that additional radio resources/capacity (e.g. secondary cell or cell group) is going to be provided. Thereby, the overshoot amount is related to the expected throughput after configuration.

In other words, for example, the TCP overshoot time duration is prolonged, so that the slow start phase is still on-going when the added resources are activated. Packet congestion in the PDCP buffer 110 will then be detected with respect to the initial and the added resources. The adjusted, e.g. increased, AQM parameter threshold may be determined by adding a time amount which is calculated based on the estimated throughput predication for the added resources or based on a known throughput for the added resources. Alternatively, the increased AQM parameter threshold may be determined by using the formula (estimated throughput_{old resources}+estimated throughput_{new resources})*RTT/estimated throughput_{old resources}, or, more particularly in case of DC, minAgeThreshold=(estimated throughput MeNB+ estimated throughput SeNB)*RTT/estimated throughput MeNB.

Thus, if MeNB 100 knows that SeNB 200 will be configured for DC, the AQM operation may be adjusted in that the AQM parameter is adjusted based on the SeNB throughput prediction. This temporary adjustment of the AQM can be performed based on the above equation.

According to further example, if MeNB 200 knows that SeNB 200 will be configured, the AQM operation may be adjusted in that the AQM is deactivated and eNB 100 starts observing the buffer state. When the PDCP buffer 110 starts to grow again due to the full utilization of both links, the AQM can be activated again using the measures described with respect to optional step S206.

In the following, some other exemplary parameters are given that may be used for adjusting the AQM operation. The minInterDropTime may be adjusted. The minInterDropTime is the time that needs to pass before a second packet is dropped (for which minAgeThreshold is reached). The maxAgeThreshold may be adjusted. The maxAgeThreshold is the queuing delay after which packets are dropped irrespectively of the minInterDropTime.

Similar parameters as described above with respect to time may similarly be used for queuing/buffer sizes. For example, exception parameters, e.g. lowerDropThreshold, may be used which define certain bounds in terms of time or buffer size in which other thresholds are used or not.

All of the mentioned AQM parameters may be pre-configured for normal AQM operation. In one example, the pre-configured minAgeThreshold may be 200 ms.

For several throughput increasing mechanisms mentioned above it is beneficial that UE 300 as well as a potentially assisting secondary node such as SeNB 200 are already configured to activate these mechanisms. In LTE DC, for example, the procedure from initiating the configuration to be able to utilize it may take up several milliseconds or even seconds, e.g. 50-200 ms. The eNB 100 is able to estimate (or does precisely know) this configuration time. The configuration time can e.g. be based on the backhaul delay between MeNB 100 and SeNB 200 in DC, as well as the time on the radio interface to transmit the RRC command to reconfigure UE 300. It may be ensured that during this phase of configuring throughput increasing mechanisms, congestion is not already indicated, as the latter would lead e.g. to TCP reacting on this indication and lowering throughput or congestion window growth.

That is, adjusting the AQM parameters (e.g. in order to prolong the time of increased allowed TCP overshoot) may consider the time or delay it takes to configure the additional resources. For example, in DC, the configuration time may be related to a multiple of the backhaul delay between MeNB 100 and SeNB 200 plus the time it takes to submit an RRC message to the UE 300. The MeNB 100 would use the adjusted/increased AQM threshold parameter, e.g. minAgeThreshold, as long as the configuration of DC takes. Afterwards it may readjust the adjusted AQM threshold again, e.g. the adjusted minAgeTreshold, as described in more detail below with respect to step S206. That is, above methods have been described to avoid indications of congestion if the congestion is likely to dissolve, e.g. by reconfiguring AQM parameters. In the following section, methods to reactivate such indications of congestion mechanism, e.g. after the avoidance phase, are described.

In optional step S206, AQM operation is readjusted when a trigger event is detected. This may be regarded as some kind of reactivation of indication of congestion after avoidance phase. When detecting a trigger, eNB 100 readjusts the AQM operation, e.g. decreases the AQM parameter threshold again. For example, the AQM parameter may be readjusted to its initial value, to a default value, to an estimated value calculated based on the current throughput using all resources, to an estimated value being twice the RRT or the like. The trigger event may be that the added resources are configured, may be the lapse of an estimated time delay related to completing the configuration based on message flow time, may be based on monitoring a time length of times during which PDCP buffer 110 is empty, and/or may be based on arrival and departure times of packets in PDCP buffer 110.

The adjusted AQM threshold(s) may be lowered, e.g. reconfigured to the default value(s) again, once the additional capacity is in use. For example, after TCP slow start phase has finished and all available radio resources are fully utilized since the TCP congestion window is large enough, AQM threshold(s) can be reset, or at least lowered. In this way, TCP is again able to react faster to e.g. throughput changes (decreases) after the additional radio resources have been added. For example, in this way, TCP is able to react faster when the additional resources are not available anymore.

As explained above with respect to step S204, in case the estimation of the additional radio capacity is not possible before configuring it (e.g. connecting to a SeNB 200 in case of DC), AQM can be deactivated to delay the end of the slow start.

This can be interpreted as setting e.g. the minAgeThreshold to infinity. After SeNB 200 is configured/activated, MeNB 100 can estimate the increase in throughput and reactivate the AQM with new readjusted AQM parameters (step S206). The MeNB 100 can estimate its own throughput to UE 300, as well as the combined secondary link (link between SeNB 200 and UE 300) throughput from its own point of view. This includes the effect of the rate at the backhaul and SeNB 200 throughput. With the knowledge about the rate with which the acknowledgements of successful PDCP PDU delivery are received, MeNB 100 can calculate the PDCP overall packet RTT. Based on that, AQM can be reconfigured to minAgeThreshold=2*estimatedRTT, for example.

In another option, readjusting AQM operation may be triggered by evaluating whether the AQM operation has been adjusted for a certain time or duration. The certain time or duration may be based on the configuration time UE 300 requires to be configured for the capacity increase. For example, adjusted AQM operation, e.g. AQM operation with one or more adjusted AQM parameters, may be performed for at least two times backhaul delay between MeNB 100 and SeNB 300 in case of activate DC plus RRC-reconfiguration delay to UE 300. Afterwards, AQM operation may be readjusted.

To give a specific example, it may be determined that DC has to or is going to be activated. At the time instance when it is determined that DC is to be activated, a timer is activated. The timer length may be 100 ms, for example (2 times backhaul plus RRC reconfiguration of UE) plus additional 50 ms. When the timer expires the AQM operation is readjusted. The trigger event of evaluating whether a timer has expired can be combined with any other trigger event for triggering that AQM operation is to be readjusted. This combination may be implemented, for example, by checking that timer has expired and additionally checking that on/more further trigger events mentioned herein are performed/fulfilled.

Another option to trigger readjustment or reactivation of AQM, as described in step S206, could be based on the buffer state. If the radio resources are not fully utilized (e.g. there is not enough packets in PDCP buffer 110 to fully utilize both links), the rate of data flowing into the PDCP buffer 110 is lower than the rate with which it is emptied. This causes the PDCP buffer 110 to run empty between the arrivals of different TCP transmission bursts. When starting to fully utilize both links, e.g. at the end of the extended slow start, the times during which the PDCP buffer 110 is empty get shorter as explained above with respect to FIG. 4a, which could be monitored and based on that readjustment or reactivation of AQM could be triggered (step S206). Alternatively, data arrival and departure times could be monitored, and a decision on readjustment or reactivation could be based on time of stay in the queue of such packets as explained above with respect to FIG. 4b.

To summarize the above, it is, inter alia, described herein to efficiently change AQM operation, e.g. one or more AQM parameters, to improve the end user performance of applications using TCP in case that capacity increase(s) can be predicted by eNB 100, e.g. by adding a SeNB 200 or WiFi AP in case of LTE DC or LTE/WiFi aggregation, respectively. For example, in case MeNB 100 knows that additional capacity becomes available in X seconds, it will increase the AQM max queuing delay, e.g. the AQM minAgeThreshold, by Y seconds temporarily for a time of at least X seconds. In this way, the artificial end of the slow start is delayed so that the slow start phase spans also over the time when the additional capacity is available so that the total link capacity can be utilized as quickly as possible.

By means of the technique proposed herein indications of congestion can be avoided when congestion is likely to dissolve. A mechanism is proposed for suppressing indications of congestion of a data packet queue when determining that said congestion of said data packet queue is likely to dissolve. Congestion, e.g. long queuing delays and thus AQM packet drops, can be avoided by increasing throughputs, which leads to emptying the queue faster. The eNB 100 can determine with a high likelihood or certainty that this congestion is about to dissolve once throughput increasing mechanisms are active. The eNB 100 can further estimate the activation delay of such throughput increasing mechanisms, for example the configuration delay for LTE DC and usage of the secondary cell group, carrier aggregation or LTE-WiFi aggregation.

In this way, inter alia, improved end user experience by lower download times due to more efficient adaptive queue management is achieved.

The details explained above with respect to FIGS. 1 to 4b may be summarized with respect to FIG. 5. FIG. 5 is a block diagram schematically illustrating a device embodiment of an access network node 2 for adjusting adaptive queue management (AQM) operation in a wireless communication network.

By way of example, the access network node 2 is described to implement the functionalities of the access network node 100 according to the embodiment of FIG. 1. The access network node 2 comprises a memory 4 and a processor 6. The access network node may further comprise an optional interface. The memory 4 contains control instructions executable by the processor 6. The processor 6 is configured to determine whether an increase in capacity for data transmission between the access network node and a wireless communication device is expected. The processor 6 is further configured to adjust AQM operation associated with the access network node, if it is determined that an increase in capacity for data transmission between the access network node and the wireless communication device is expected. The interface may be configured to carry out any communication with other components of the communication network. For example, the interface may transmit information to other components of the communication network and/or may receive information from other components of the communication network.

Figure 6:
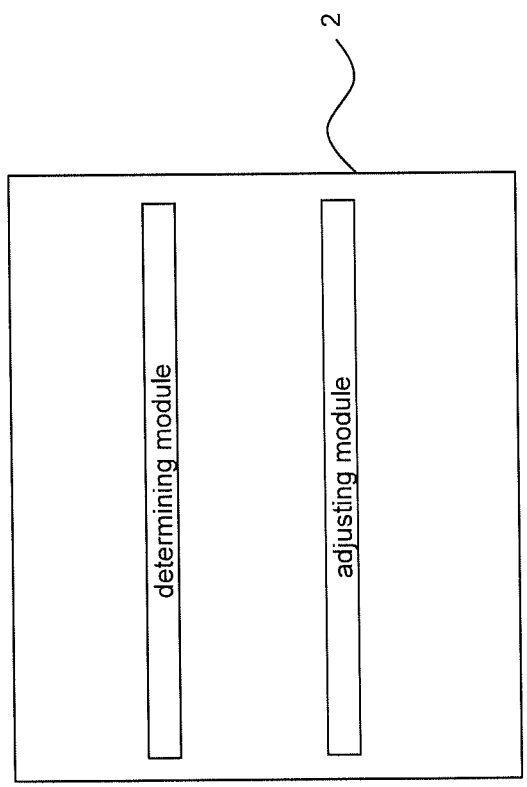
FIG. 6 is a block diagram schematically illustrating a further embodiment of an access network node.

FIG. 6 shows a functional block diagram of an access network node 2 configured in accordance with the principles of the disclosure as described above. The functional blocks of the access network node 2 may be implemented by hardware, software, or a combination of hardware and software to carry out the principles of the disclosure. It is understood by a person skilled in the art that the functional blocks described in FIG. 6 may be combined or separated into sub-blocks to implement the principles of the disclosure as described above. Therefore, the description herein may support any possible combination or separation or further definition of the functional blocks described herein. The access network node 2 of FIG. 6 is for adjusting adaptive queue management (AQM) operation in a wireless communication network. The access network node 2 comprises a determining module for determining whether an increase in capacity for data transmission between the access network node and a wireless communication device is expected. The access network node 2 further comprises an adjusting module for adjusting AQM operation associated with the access network node, if it is determined that an increase in capacity for data transmission between the access network node and the wireless communication device is expected.

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the present disclosure can be varied in many ways, it will be recognized that the present disclosure should be limited only by the scope of the following claims.

The invention claimed is:

1. A method of adjusting adaptive queue management (AQM) operation in a wireless communication network, the method comprising:
determining, by an access network node of the wireless communication network, whether an increase in capacity for data transmission between the access network node and a wireless communication device is expected, wherein the determining whether the increase in capacity is expected comprises at least one of:
determining whether one or more additional radio resources for the data transmission between the access network node and the wireless communication device are expected to be added; and
determining whether more efficient use of radio resources for the data transmission between the access network node and the wireless communication device is expected, wherein the more efficient use is one of an activation of already established resources, a higher modulation and coding scheme, and a more efficient configuration;
adjusting, by the access network node, the AQM operation associated with the access network node, when it is determined that the increase in capacity for the data transmission between the access network node and the wireless communication device is expected; and
detecting a trigger event and readjusting the AQM operation when the trigger event is detected, wherein the detecting the trigger event comprises evaluating whether the AQM operation has been adjusted for a certain time.

2. The method of claim 1, wherein the determining whether the increase in capacity is expected further comprises at least one of:
determining whether an activation of a further access network node for dual connectivity to the wireless communication device is expected;
determining whether an activation of an access network cell for carrier aggregation to the wireless communication device is expected;
determining whether prioritization of the wireless communication device for use of radio resources is expected;
determining whether activation of an access point for utilization of radio resources of the access network node and the access point is expected;
determining whether aggregation of licensed and unlicensed radio resources for the wireless communication device is expected; and
determining whether activation for a higher capacity is expected.

3. The method of claim 1, wherein the determining whether the increase in capacity is expected further comprises monitoring at least one of a buffer fill state and a buffer fill rate of a data buffer associated with the access network node.

4. The method of claim 1, wherein the adjusting the AQM operation comprises adjusting one or more AQM parameters of the AQM operation associated with the access network node.

5. The method of claim 4, wherein the adjusting the one or more AQM parameters comprises increasing the one or more AQM parameters.

6. The method of claim 5, wherein the increasing the one or more AQM parameters comprises increasing an AQM parameter indicating a time when to drop a first packet of the data transmission between the access network node and the wireless communication device.

7. The method of claim 1, wherein the adjusting the AQM operation comprises switching off the AQM operation.

8. The method of claim 1, wherein the readjusting the AQM operation comprises readjusting one or more AQM parameters of the AQM operation.

9. The method of claim 8, wherein the readjusting the one or more AQM parameters comprises decreasing the one or more AQM parameters.

10. The method of claim 8, wherein the one or more AQM parameters are readjusted to at least one of:
one or more initial values of the AQM operation;
one or more default values of the AQM operation;
one or more values estimated based on a current throughput of the data transmission between the access network node and the wireless communication device; and
one or more values estimated based on a round-trip-time of the data transmission between the access network node and the wireless communication device.

11. The method of claim 1, wherein the readjusting the AQM operation comprises reactivating a switched-off AQM operation.

12. The method of claim 1, wherein the detecting the trigger event further comprises detecting whether the increased capacity is configured.

13. The method of claim 1, wherein the detecting the trigger event further comprises at least one of:
monitoring a buffer fill state of a data buffer associated with the access network node;
monitoring a buffer fill rate of a data buffer associated with the access network node;
monitoring arrival and departure times of data packets in a data buffer associated with the access network node; and
monitoring a queuing time of data packets in a data buffer associated with the access network node.

14. A non-transitory computer readable recording medium storing a computer program product for adjusting adaptive queue management (AQM) operation in a wireless communication network, the computer program product comprising software instructions which, when run on processing circuitry of an access network node of the wireless communication network, cause the access network node to:
determine whether an increase in capacity for data transmission between the access network node and a wireless communication device is expected, by at least one of:
determining whether one or more additional radio resources for the data transmission between the access network node and the wireless communication device are expected to be added; and determining whether more efficient use of radio resources for the data transmission between the access network node and the wireless communication device is expected, wherein the more efficient use is one of an activation of already established resources, a higher modulation and coding scheme, and a more efficient configuration;

adjust the AQM operation associated with the access network node, when it is determined that the increase in capacity for the data transmission between the access network node and the wireless communication device is expected; and detect a trigger event and readjust the AQM operation when the trigger event is detected, wherein the detection of the trigger event comprises evaluation whether the AQM operation has been adjusted for a certain time.

15. An access network node for adjusting adaptive queue management (AQM) operation in a wireless communication network, the access network node comprising:

processing circuitry;

memory containing instructions executable by the processing circuitry whereby the access network node is operative to:

determine whether an increase in capacity for data transmission between the access network node and a wireless communication device is expected, by at least one of:

determining whether one or more additional radio resources for the data transmission between the access network node and the wireless communication device are expected to be added; and determining whether more efficient use of radio resources for the data transmission between the access network node and the wireless communication device is expected, wherein the more efficient use is one of an activation of already established resources, a higher modulation and coding scheme, and a more efficient configuration;

adjust the AQM operation associated with the access network node, when it is determined that the increase in capacity for the data transmission between the access network node and the wireless communication device is expected; and detect a trigger event and readjust the AQM operation when the trigger event is detected, wherein the detection of the trigger event comprises evaluation whether the AQM operation has been adjusted for a certain time.

16. The access network node of claim 15, wherein the access network node comprises, or is configured as, or is part of: a radio base station, a radio network controller, a NodeB, an eNodeB or an access point.

17. A wireless communication system, comprising:

an access network node comprising processing circuitry and memory, the memory containing instructions executable by the processing circuitry whereby the access network node is operative to:

determine whether an increase in capacity for data transmission between the access network node and a wireless communication device is expected, by at least one of:

determining whether one or more additional radio resources for the data transmission between the access network node and the wireless communication device are expected to be added; and determining whether more efficient use of radio resources for the data transmission between the access network node and the wireless communication device is expected, wherein the more efficient use is one of an activation of already established resources, a higher modulation and coding scheme, and a more efficient configuration;

adjust the AQM operation associated with the access network node, when it is determined that the increase in capacity for the data transmission between the access network node and the wireless communication device is expected; and detect a trigger event and readjust the AQM operation when the trigger event is detected, wherein the detection of the trigger event comprises evaluation whether the AQM operation has been adjusted for a certain time; and one or more wireless communication devices.

* * * * *